United States Patent
Lindholm et al.

(10) Patent No.: US 7,564,456 B1
(45) Date of Patent: Jul. 21, 2009

(54) APPARATUS AND METHOD FOR RASTER TILE COALESCING

(75) Inventors: John Erik Lindholm, Saratoga, CA (US); Henry Packard Moreton, Woodside, CA (US); John S. Montrym, Los Altos Hills, CA (US); Scott R. Whitman, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 509 days.

(21) Appl. No.: 11/332,695

(22) Filed: Jan. 13, 2006

(51) Int. Cl.
*G06F 17/00* (2006.01)
*G06T 15/50* (2006.01)
*G09G 5/00* (2006.01)

(52) U.S. Cl. .................. 345/426; 345/418; 345/613

(58) Field of Classification Search .......... 345/418, 345/629, 419, 426, 613, 614
See application file for complete search history.

(56) References Cited

U.S. PATENT DOCUMENTS

| 5,262,965 | A  | * | 11/1993 | Putnam et al. ............... 358/1.1 |
| 6,075,544 | A  |   | 6/2000  | Malachowsky et al. |
| 2006/0033743 | A1 | * | 2/2006  | Morein ....................... 345/501 |
| 2007/0165035 | A1 | * | 7/2007  | Duluk et al. ................. 345/506 |

* cited by examiner

*Primary Examiner*—Chante Harrison
(74) *Attorney, Agent, or Firm*—Cooley Godward Kronish LLP

(57) ABSTRACT

A graphics pipeline rasterizes primitives and generates a stream of groups of pixels, such as a stream of pixel quads. A tile coalesce unit received the stream of groups of pixels and generates pixel tiles for use by downstream pixel processing units. The pixel tiles facilitate hazard checks and transaction coherency.

18 Claims, 5 Drawing Sheets

APPARATUS AND METHOD FOR RASTER TILE COALESCING

FIELD OF THE INVENTION

The present invention is generally related to techniques to improve memory coherency and perform hazard checking in pixel processors.

BACKGROUND OF THE INVENTION

A Graphics Processing Unit (GPU) is typically implemented as a graphics pipeline. Conventionally, one or more stages perform vertex and geometry processing to generate graphical primitives mapped to a two-dimensional screen space. The graphical primitives are typically triangles, although other primitive shapes may also be used. A setup stage is typically included to calculate the edges of graphical primitives (e.g., triangles) and perform other calculations to prepare the primitives for rasterization. A raster stage rasterizes the primitives by determining the coverage of the primitives across sample locations of pixels and generating a set of fragments and pixel locations. Conventionally, the fragments are provided to downstream components as stream of pixels, typically in groups of four pixels known as "quads." A pixel processing stage, such as a shader stage, processes the fragments and colors the pixels. A raster operations (ROP) stage performs various functions such as frame buffer blending, antialiasing, and Z operations, such as z-culling. Modern GPUs also typically implement many stages with parallel processing units, such as parallel pixel shading elements working in parallel on different pixels.

Pixel shading typically requires a comparatively large amount of processing resources. In addition to performing shading operations for each quad group of pixels, a pixel shader may also have to perform a hazard avoidance check for each group of pixels that it receives. That is, each group of pixels must be checked for conflicts in reading/writing data to the same (x,y) pixel locations as other quads.

Moreover, pixel shading typically requires memory accesses to access and manipulate data. The memory access operations may be inefficient unless there is a high degree of memory coherency. That is, memory requests are ideally issued simultaneously to contiguous regions of memory in a manner that fully utilizes the capacity of the memory interface. For example, a pixel shading architecture with a high degree of memory coherency may issue memory requests in parallel to a contiguous region of memory on a memory page to improve performance. However, in some pixel shader architectures the stream-like manner in which pixel quads are processed makes it difficult to organize memory accesses with a high degree of memory coherency.

In light of above-described problems, the apparatus and method of the present invention was developed.

SUMMARY OF THE INVENTION

A graphics system coalesces groups of pixels generated by a raster processor into pixel tiles. The pixel tiles may used for hazard checks and to improve transaction coherency in downstream processing elements.

One embodiment of a graphics pipeline includes a raster processor to rasterize graphical primitives. The raster processor generates a raster output in the form of a stream of groups of pixels. Each group of pixels includes a first pre-selected number of contiguous pixels and at least one sample per pixel identifying a source primitive covering the sample location. A tile coalesce unit receives the stream of groups of pixels from the raster processor. The tile coalesce unit accumulates groups of pixels into pixel tiles comprising a second pre-selected number of groups of pixels such that an individual pixel tile covers a region of pixel locations greater than an individual group of pixels. The pixel tiles permit at least one downstream pixel processing stage to perform at least one transaction on tile-sized regions of pixels.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
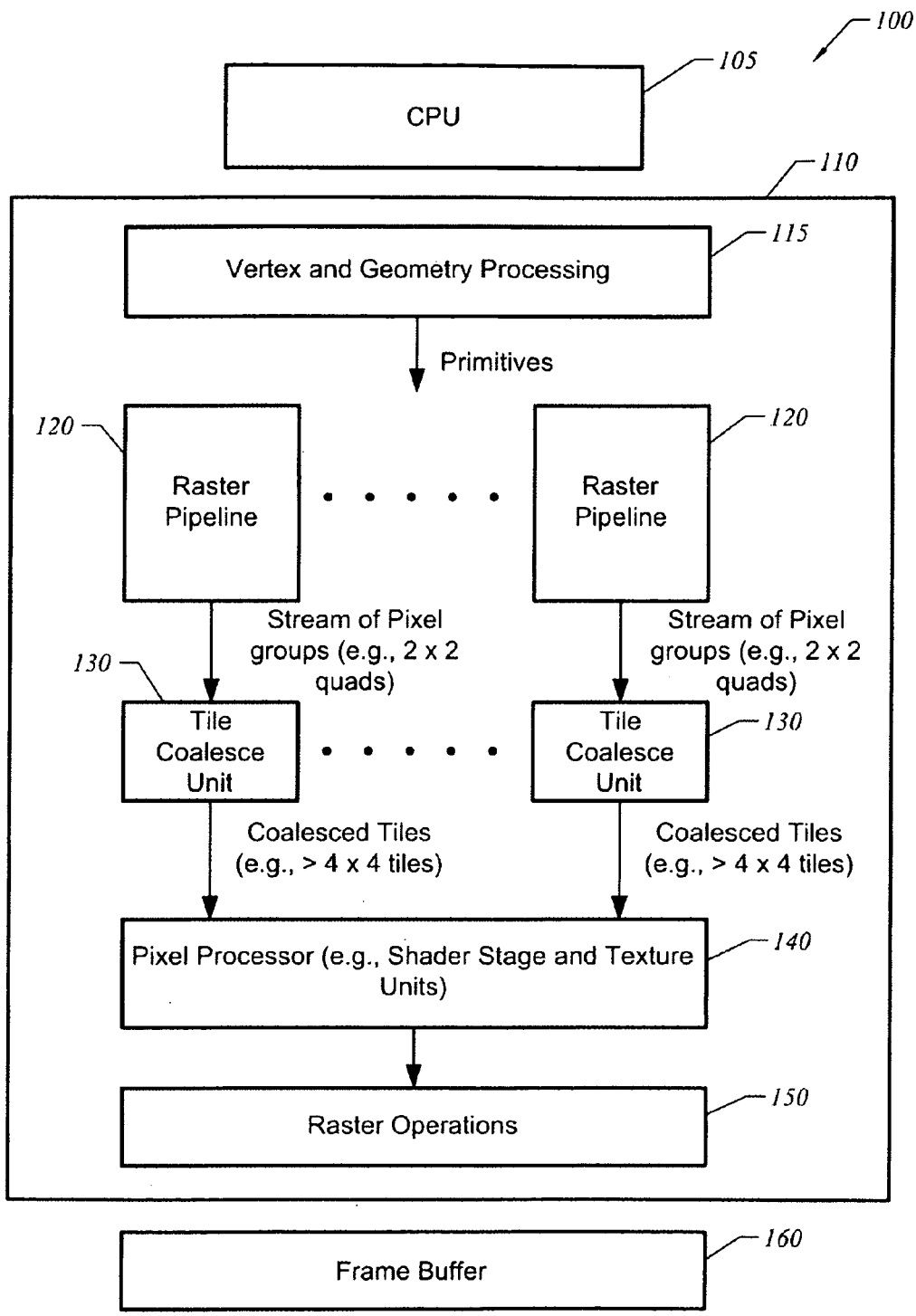
FIG. 1 illustrates a graphics system for coalescing raster tiles in accordance with one embodiment of the present invention.

FIG. 1 is a block diagram of a graphics system 100 in accordance with one embodiment of the present invention. A central processing unit (CPU) 105 generates graphics commands received by a graphics processing unit (GPU) 110. GPU 110 includes a graphics pipeline having at least one stage 115 to perform vertex and geometry processing to generate graphical primitives, such as triangles. The graphics pipeline includes at least one raster pipeline 120 to rasterize primitives. As illustrated in FIG. 1, in one embodiment there is a sequence of parallel raster pipelines to rasterize different sections of a screen space in parallel. Each raster pipeline outputs data as a stream of pixel groups of a pre-selected size, such as 2×2 quads of pixels covering four pixels. For example, each raster pipeline 120 outputs a first quad, a second quad, and so on for a frame. Note that the sequence of parallel raster pipelines may be dedicated to processing specific portions of a screen. Alternatively, the sequence of raster pipelines may be assigned regions of screen space dynamically.

Tile coalesce units 130 are provided to coalesce pixel groups into pixel tiles covering a larger set of pixel locations, such as a 4×4 region covering 16 pixels. As a result, a downstream pixel processing stage 140, such as a shader stage and texture units, can perform transactions on a tile basis to improve processing efficiency. Examples of transactions that may be performed on a tile basis include performing hazard avoidance checks at a tile level and performing memory access operations for texture operations on sets of pixels identified by the tiles. For the case of hazard avoidance checks, the present invention permits hazard detection in a unit, such as a pixel shader or raster operations (ROP) unit, by tracking tile addresses and determining hazards at a tile level. If there are no hazards at a tile level, the tiles can be executed in any order. If a potential hazard exists, (e.g., more than one instance of the same tile) the pixel tiles may be executed in input order to avoid a hazard. For the case of memory accesses, the pixel tiles permit an improvement in memory coherency, i.e., memory can be accessed as chunks of data having a high coherence such that memory access efficiency is improved. For example, the pixel tiles may be used to improve the efficiency of memory transactions associated with texture fetches by texture units. Additionally, the pixel tiles provide information on the relationships between pixels over an increased area, which may be also be used as metadata resource for improving other types of transactions.

Note that a pixel processing stage 140 receiving tiles is preferably adapted to also decompose the pixel tile into appropriate single instruction multiple data (SIMD) threads of work. That is, to fully utilize the increased coherency permitted by the tiles, downstream pixel processing elements are preferably adapted to utilize pixel tiles instead of conventional quads. Downstream pixel processing elements may also, for example, utilize an (x, y) bit mask to extract data from pixel tiles.

GPU 110 may also include a conventional raster operations (ROP) stage 150 to perform raster operations such as z testing and color operations. GPU 110 may access an external frame buffer 160 using a memory controller (not shown in FIG. 1).

Figure 2:
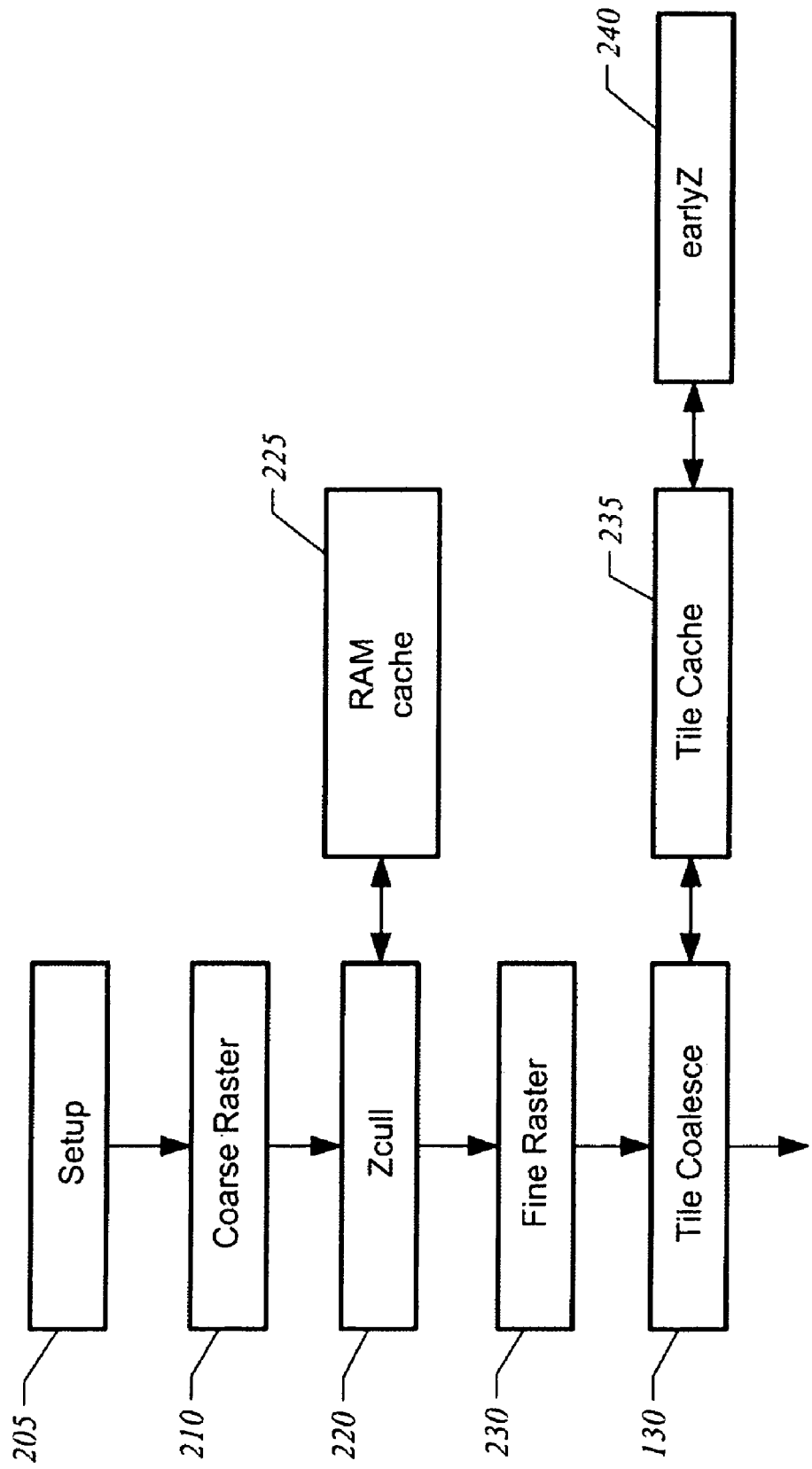
FIG. 2 illustrates a portion of a graphics pipeline including raster tile coalescing in accordance with one embodiment of the present invention.

FIG. 2 illustrates in more detail a portion of the graphics pipeline. A setup unit 205 calculates primitive edge information for rasterization. A coarse raster unit 210 provides rasterization at a coarse scale. A Z-cull unit 220 may be provided to perform an initial z test to cull occluded primitives to reduce the workload on downstream elements, e.g., Z-cull unit 220 may cull occluded regions at a coarse scale, such as for 8×8 groups of pixels. A cache 225 is provided for Z-cull unit 220 to perform a z-test operation with previously observed primitives. A fine raster module 230 performs the final rasterization step on a pixel-by-pixel basis. A tile cache 235 is provided to coalesce a plurality of tiles for tile coalesce unit 130. In one embodiment tile cache 235 is sized to store eight pixel tiles. Each pixel tile has associated (x, y) pixel locations. An output of tile coalesce unit 130 is tile information that includes (x, y) tile location along with a primitive identifier for each sample location in a pixel tile. The number of pixel tiles in tile cache 235, the number of pixels in a tile, and the number of samples per pixel will be determined by balancing storage and processing requirements versus gains in downstream processing efficiency associated with increased coherence and spatial resolution. As an illustrative example, a tile cache 235 may have eight tiles. A maximum tile size of 1 kilobit is compatible with any of the following: a 16×16 pixel tile with 1 sample per pixel and a 4 bit primitive ID code; an 8×16 pixel tile with 2 samples per pixels and a 4 bit primitive ID code; an 8×8 pixel tile with 4 samples per pixel and a 4 bit primitive ID code; a 4×8 pixel tile with 8 samples per pixel and a 4 bit primitive ID code; or a 4×4 pixel tile with 16 samples per pixel and a 4 bit primitive ID code.

In one embodiment, tile cache 235 maintains only a single version of each pixel tile. Quads are accumulated and an instance of a tile is maintained in tile cache 235 until evicted. An eviction occurs if a timeout condition occurs, an overflow condition occurs (e.g., a tile is full), a decision to generate a new tile allocation is made, to prevent a hazard condition (e.g., a new pixel quad has a sample overlap with cached values), or a tile flush is performed.

Figure 3:
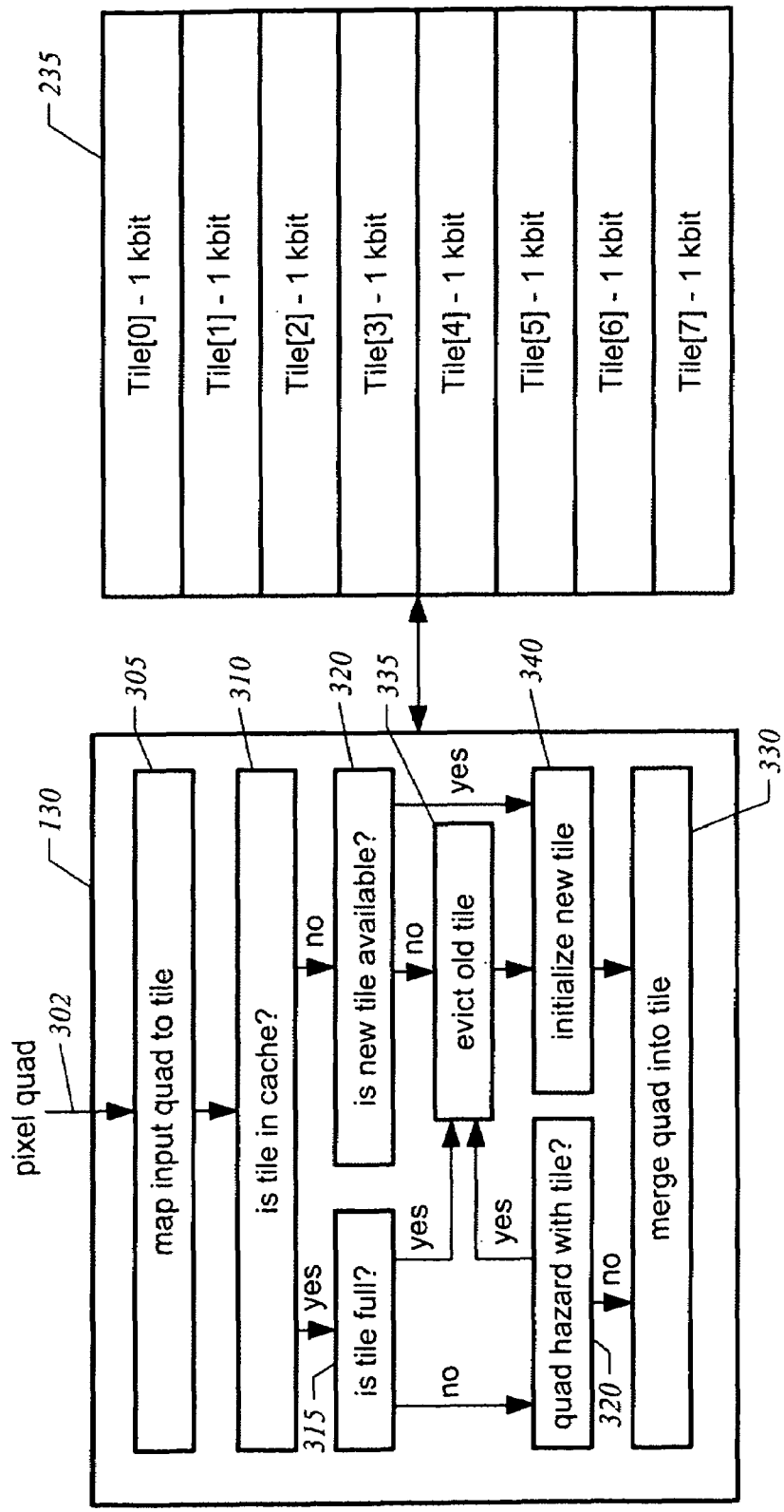
FIG. 3 is a functional block diagram of a tile coalescing unit in accordance with one embodiment of the present invention.

FIG. 3 is a flow chart illustrating a method of coalescing quads into a pixel tile. A new pixel quad is received 302. Based on the (x,y) locations of the pixels, the input quad is mapped 305 to the (x, y) location of the pixel tile. A determination 310 is made whether a pixel tile having the same coordinates has been previously initialized and is present in tile cache 235. If a pixel tile is in cache, a determination 315 is made if the tile is full. If the pixel tile is full, the old tile is evicted 335 and a new tile is initialized 340 before merging 330 the quad into the new tile. If the pixel tile is not full, a quad hazard test is performed 320 to make sure there is not a conflict between the new pixel quad and previous tile data. If there is no hazard, the new quad is merged 330 into the pixel tile. However, if a hazard is detected, the old pixel tile is evicted 335, a new pixel tile initialized 340, and then the quad is merged into the new pixel tile 330.

The pixel quads are merged into a pixel tile by checking the coverage of the quad and the matching tile. Each pixel of a quad has an (x, y) location, at least one sample location, and a primitive identifier (ID) code providing an index into the primitive covering the sample location. For example, a 4-bit primitive ID code permits an encoding in which a value of zero corresponds to an uncovered sample location along with index values to fifteen different possible primitives covering the sample location. Each primitive also has a n associated current state pointer.

Figure 4:
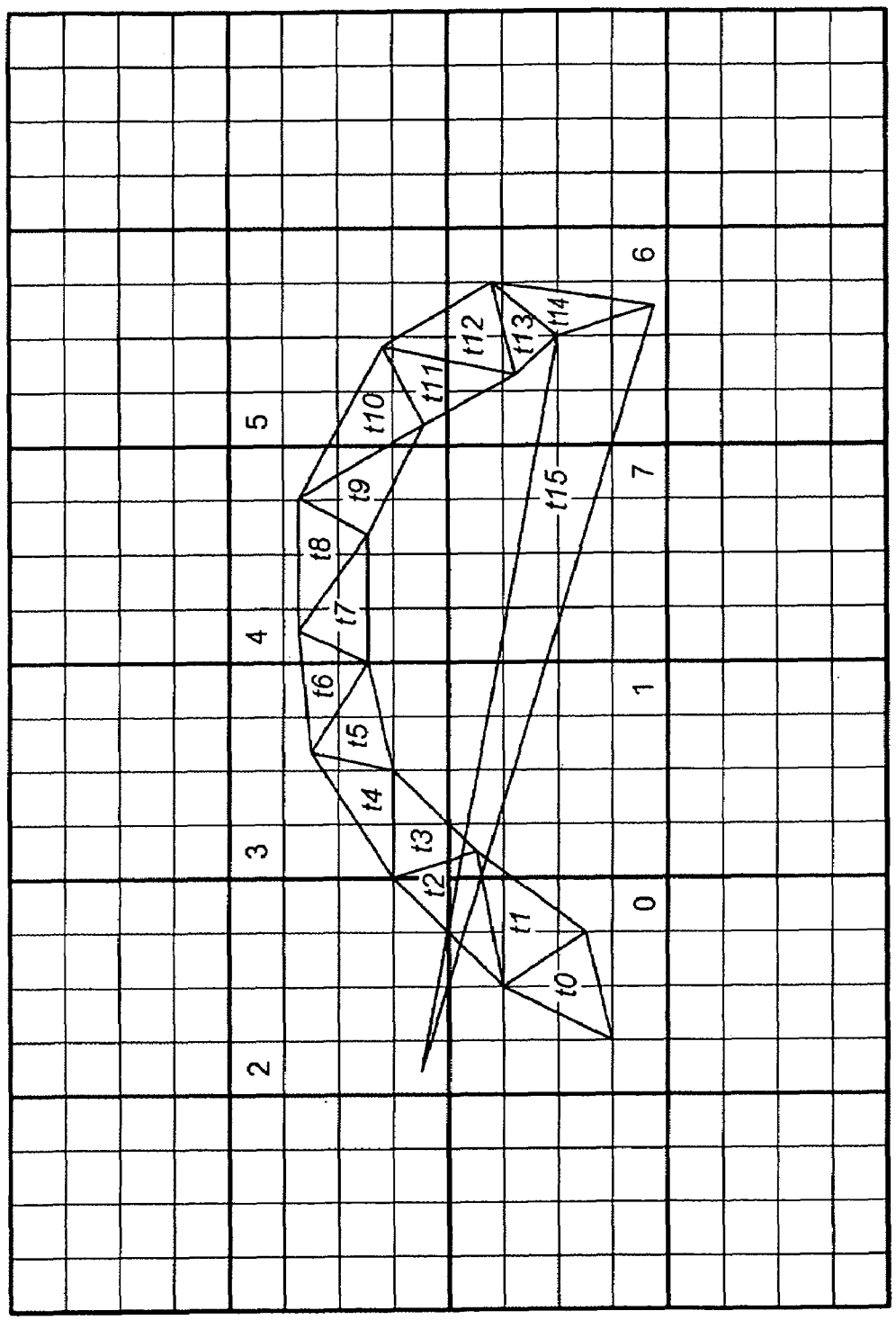
FIG. 4 illustrates an exemplary sequence of triangles in a strip intersecting pixel tiles.

FIG. 4 illustrates a sequence of primitives of a strip. In this example, the primitives correspond to sixteen triangles t0-t15 having a corresponding primitive order. Eight pixel tiles, Tile 0 to Tile 7, are illustrated. Each tile corresponds to a 4×4 region of pixels that has sixteen pixels. Thus, in this example, an individual tile encompasses information for a region corresponding to four quads. As each new primitive in the sequence is rasterized, corresponding quads are generated in particular tile regions, and coalescing decisions are made for individual tiles as new quads are received.

As an illustrative example, the tile coalescing may proceed as described in Table 1, assuming that the coalescing proceeds in primitive order, i.e., triangle t0 is drawn, then triangle t1 and so on until triangle t15 is drawn. For each primitive, quads are generated for one or more tile locations. In this example, it is assumed that the tile cache begins in a cleared/default state such that an initialization is required for the first instance that a primitive in the sequence covers a portion of the tile. Note that because triangle t15 wraps back onto the strip that triangle t15 generates hazard conditions for Tile 0 and Tile 1.

TABLE 1

Exemplary sequence of coalescing operations.

| Primitive | Tile Location | Action For Quads Of Primitive At Tile Location |
|---|---|---|
| Primitive t0 | Tile 0 | Initialize Tile 0 and merge quads for triangle t0 into Tile 0 |
| Primitive t1 | Tile 0 | Merge quads for triangle t1 into Tile 0 |
| Primitive t1 | Tile 1 | Initialize Tile 1, and merge quads for triangle t1 into Tile 1 |
| Primitive t2 | Tile 0 | Merge quads for triangle t2 into Tile 0 |
| Primitive t2 | Tile 1 | Merge quads for triangle t2 into Tile 1 |
| Primitive t2 | Tile 2 | Initialize Tile 2 and merge quads for triangle t2 into Tile 2 |
| Primitive t2 | Tile 3 | Initialize Tile 3 and merge quads for triangle t2 into Tile 3 |
| Primitive t3 | Tile 1 | Merge quads for triangle t3 into Tile 1 |
| Primitive t3 | Tile 3 | Merge quads for triangle t3 into Tile 3 |
| Primitive t4 | Tile 3 | Merge quads for triangle t4 into Tile 3 |
| Primitive t5 | Tile 3 | Merge quads for triangle t5 into Tile 3 |
| Primitive t6 | Tile 3 | Merge quads for triangle t6 into Tile 3 |

TABLE 1-continued

Exemplary sequence of coalescing operations.

| Primitive | Tile Location | Action For Quads Of Primitive At Tile Location |
|---|---|---|
| Primitive t6 | Tile 4 | Initialize Tile 4 and merge quads for triangle t6 into Tile 4 |
| Primitive t7 | Tile 4 | Merge quads for triangle t7 into Tile 4 |
| Primitive t8 | Tile 4 | Merge quads for triangle t8 into Tile 4 |
| Primitive t9 | Tile 4 | Merge quads for triangle t9 into Tile 4 |
| Primitive t9 | Tile 5 | Initialize Tile 5 and merge quads for triangle t9 into Tile 5 |
| Primitive t10 | Tile 4 | Merge quads for triangle t10 into Tile 4 |
| Primitive t10 | Tile 5 | Merge quads for triangle t10 into Tile 5 |
| Primitive t11 | Tile 5 | Merge quads for triangle t11 into Tile 5 |
| Primitive t11 | Tile 6 | Initialize Tile 6 and merge quads for triangle t11 into Tile 6 |
| Primitive t12 | Tile 5 | Merge quads for triangle t12 into Tile 5 |
| Primitive t12 | Tile 6 | Merge quads for triangle t12 into Tile 6 |
| Primitive t13 | Tile 6 | Merge quads for triangle t13 into Tile 6 |
| Primitive t14 | Tile 6 | Merge quads for triangle t14 into Tile 6 |
| Primitive t15 | Tile 6 | Merge quads for triangle t15 into Tile 6 |
| Primitive t15 | Tile 7 | Initialize Tile 7 and merge quads for triangle 15 into Tile 7 |
| Primitive t15 | Tile 1 | Hazard evict Tile 1 in light of triangle t15 overlapping previous quad data in Tile 1; initialize a new Tile 1 and merge quads for triangle t15 into new Tile 1 |
| Primitive t15 | Tile 0 | Hazard evict Tile 0 in light of triangle t15 overlapping previous quad data in Tile 0; initialize a new Tile 1 and merge quads for triangle t15 into new Tile 0 |
| Primitive t15 | Tile 2 | Merge quad for triangle t15 into Tile 2 |

Figure 5:
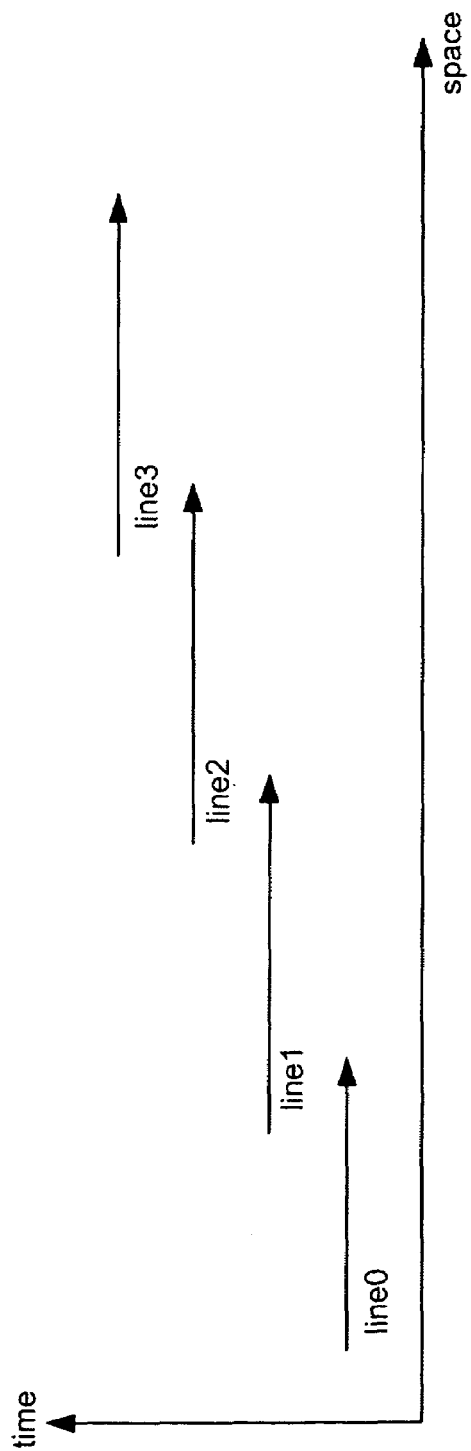
FIGS. 5 and 6 illustrate an example of line coalescing with multiple versions of a tile.
Figure 6:
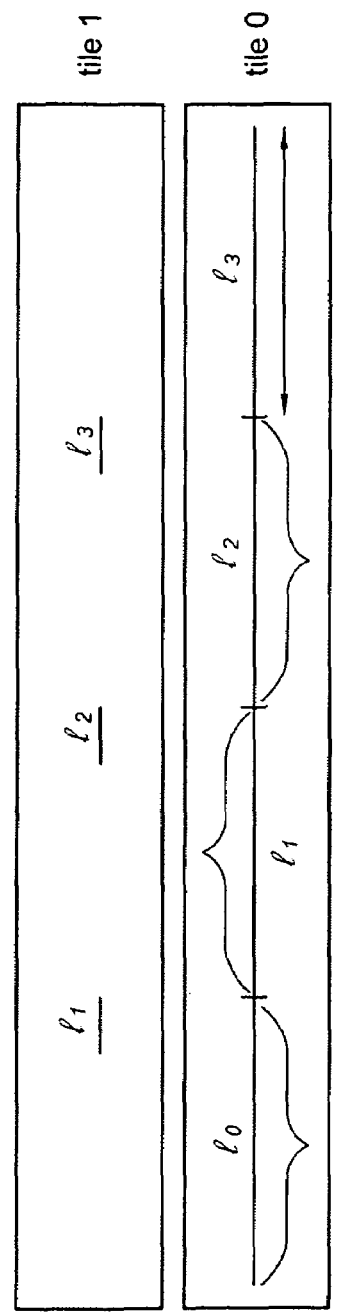

In an alternative embodiment a tile cache 235 may maintain multiple versions of the same pixel tile at the same time. This complicates hazard checking. However, maintaining multiple versions of the same pixel tile also has certain benefits such as permitting source data to be split into multiple pieces when resource limits are exceeded for the source data or conflicts prevent all of the information of the source data from being stored in a single pixel tile. FIGS. 5 and 6 illustrate an example in which multiple versions of a pixel tile are maintained for an anti-aliased linestrip. FIG. 5 illustrates a sequence of linestrips line 0, line 1, line 2, and line 3 drawn at different times. Corresponding segments of tile data derived from the linestrips are 10, 11, 12, and 13, respectively (i.e., 10 is tile data derived from linestrip line 0, 11 is tile data derived from line 1, 12 is tile data derived from line 2, and 13 is tile data derived from line 3). Line 0, line 1, line 2, and line 3 partially overlap in tail regions. Consequently, if a single version of a pixel tile was utilized some of the information in the spatially overlapping regions would be lost. In this example, two versions of the pixel tile are maintained where, for example, tile 1 corresponds to line data that cannot be merged into tile 0 without generating an internal conflict with previously accumulated tile data. Thus, the coalescing of tile 0 may proceed with line 0 merged into tile 0, the non-overlapping portion of line 1 merged into tile 0, the non-overlapping portion of line 2 merged into tile 0, and finally the non-overlapping portion of line 3 merged into tile 0. In this example, tile 1 has merged into it the overlapping portions of the line segments that would generate conflicts, namely first the overlapping portion of line 1 with respect to line 0, then the overlapping portion of line 2 with respect to line 1, and finally the overlapping portion of line 3 with respect to line 2. In this example, the drawing order can be preserved by maintaining two different tiles, preferably with different time stamps.

One benefit of the present invention is that groups of pixels are coalesced early in the graphics pipeline immediately after fine rasterization has taken place. This permits pixel processing stages immediately downstream of the raster stage, such as shaders, to utilize the pixel tiles to reduce the computational resources required for hazard avoidance. Additionally, downstream components, such as texture units, may utilize information in the pixel tiles to improve other transactions, such as memory transactions.

One way to understand some of the benefits of the present invention is that it preserves the advantages of a fine rasterization process generating a steady stream of comparatively small groups of pixels for efficient fine rasterization while also providing a mechanism to flexibly generate contextual metadata on the relationships between the small groups of pixels in larger tile-sized regions. Additionally, tile attributes may be selected to optimize performance for different applications.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics pipeline, comprising:
   a raster processor to rasterize graphical primitives, said raster processor generating a raster output in the form of a stream of groups of pixels, each group of pixels comprising a first pre-selected number of contiguous pixels and at least one sample per pixel identifying a source primitive covering the sample location; and
   a tile coalesce unit, said tile coalesce unit receiving said stream of groups of pixels from said raster processor and coalescing accumulated groups of pixels into pixel tiles comprising a second pre-selected number of groups of pixels such that an individual pixel tile covers a region of pixel locations greater than an individual group of pixels;
   wherein said pixel tiles permit at least one downstream pixel processing stage to perform at least one transaction on tile-sized regions of pixels;
   wherein said tile coalesce unit comprises a tile cache for storing sample information for a plurality of pixel locations and wherein said tile cache is operative to maintain different versions of pixel tiles having the same (x, y) coordinates.

2. The graphics pipeline of claim 1, wherein said tile coalesce unit performs a hazard avoidance check on pixels merged into an individual pixel tile to permit a downstream pixel processing stage to perform hazard avoidance checks on tile-sized regions of pixels.

3. The graphics pipeline of claim 1, wherein said pixel tiles permit at least one downstream component to perform memory accesses on tile-sized regions of pixels.

4. The graphics pipeline of claim 1, wherein each said group of pixels is a quad group of four pixels.

5. The graphics pipeline of claim 1, wherein each pixel tile comprises at least four groups of pixels.

6. The graphics pipeline of claim 1, further comprising an early Z-culling module coupled to said tile coalesce unit to perform early Z-culling at a tile level.

7. The graphics pipeline of claim 1, wherein said at least one downstream pixel processing stage comprises a shader stage.

8. A graphics pipeline, comprising:
- a raster processor to rasterize graphical primitives, said raster processor generating a raster output in the form of a stream of groups of pixels, each group of pixels comprising a first pre-selected number of contiguous pixels and at least one sample per pixel identifying a source primitive covering the sample location; and
- a tile coalesce unit, said tile coalesce unit receiving said stream of groups of pixels from said raster processor and coalescing accumulated groups of pixels into pixel tiles comprising a second pre-selected number of groups of pixels such that an individual pixel tile covers a region of pixel locations greater than an individual group of pixels;
- wherein said pixel tiles permit at least one downstream pixel processing stage to perform at least one transaction on tile-sized regions of pixels, said tile coalesce unit comprises a tile cache for storing sample information for a plurality of pixel locations, and wherein said tile coalesce unit maps a new input group of pixels to tile locations and adds said new input group of pixels to a pixel tile if there are no conflicts with respect to previously accumulated groups of pixels for the same pixel tile.

9. The graphics pipeline of claim 8, wherein said tile coalesce unit evicts old pixel tiles in response to detecting that said new input group of pixels would generate a conflict with respect to previously accumulated groups of pixels for the same pixel tile.

10. The graphics pipeline of claim 1, wherein said pixel tiles are organized to permit at least one downstream component to perform memory accesses on tile-sized regions of pixels.

11. A graphics pipeline, comprising:
- a raster processor to rasterize graphical primitives, said raster processor generating a raster output in the form of a stream of groups of pixels, each group of pixels comprising a first pre-selected number of contiguous pixels and at least one sample per pixel identifying a source primitive covering the sample location; and
- a tile coalesce unit, said tile coalesce unit receiving said stream of groups of pixels from said raster processor and coalescing accumulated groups of pixels into pixel tiles comprising a second pre-selected number of groups of pixels such that an individual pixel tile covers a region of pixel locations greater than an individual group of pixels;
- wherein said pixel tiles permit at least one downstream pixel processing stage to perform at least one transaction on tile-sized regions of pixels, and wherein said graphics pipeline comprises a plurality of raster processors and tile coalesce units, each raster processor rasterizing a portion of screen space and having an associated tile coalesce unit for coalescing pixel tiles within an associated region of screen space.

12. The graphics pipeline of claim 11,
wherein said tile coalesce unit performs a hazard avoidance check on pixels within each pixel tile to permit a downstream shader stage to perform hazard avoidance checks on pixel tiles instead of groups of pixels.

13. The graphics pipeline of claim 12, wherein said tile coalesce unit comprises a tile cache for storing sample information for a plurality of pixel locations.

14. The graphics pipeline of claim 12, wherein each said group of pixels is a quad group of four pixels.

15. The graphics pipeline of claim 11, wherein said tile coalesce unit maps a new input group of pixels to tile locations and adds said new input group of pixels to a pixel tile if there are no conflicts with respect to previously accumulated groups of pixels for the same pixel tile.

16. The graphics pipeline of claim 11, wherein each said group of pixels is a quad group of four pixels.

17. The graphics pipeline of claim 11, further comprising an early Z-culling module coupled to said tile coalesce unit to perform early Z-culling at a tile level.

18. The graphics pipeline of claim 11, wherein said at least one downstream pixel processing stage comprises a shader stage.

* * * * *